United States Patent Office 3,101,235
Patented Aug. 20, 1963

3,101,235
PROCESS OF PREPARING SOLUTIONS OF COUPLING COMPONENTS OF THE ICE COLOR SERIES
Lüdwig Orthner, Frankfurt am Main, Karl Horst, Hofheim, Taunus, Alfred Scharf, Frankfurt am Main, Werner Kirst, Offenbach am Main, and Josef Oxé and Richard Gross, Frankfurt am Main, Germany, assignors to Farbwerke Hoechst Aktiengesellschaft vormals Meister Lucius & Brüning, Frankfurt am Main, Germany, a corporation of Germany
No Drawing. Filed Sept. 12, 1960, Ser. No. 55,110
Claims priority, application Germany Sept. 15, 1959
9 Claims. (Cl. 8—44)

In the known preparation of dyeings carried out on the fiber with water-insoluble azo-dyestuffs by coupling an applied coupling component with a diazonium salt of a diazo component, protective colloids, for instance the sodium salt of ricinoleic sulfonic acid or of lignine-sulfonic acid or sulfite cellulose liquor are added to the impregnation solution containing the coupling component. Generally, these products used as protective colloids possess only a slight wetting-out property so that, in practice, wetting agents have likewise to be added to the baths.

It is likewise known to use in the preparation of impregnation solutions as protective colloids for coupling components of the ice-color series condensation products from protein hydrolysates of the type of lysalbinic and protalbinic acid and chlorides of higher fatty acids. For this purpose there are used as wetting agents alkylaryl sulfonates as well as oxethylated alkyl phenols per se or in admixture with one another. When applying these known processes, it was found that the stability of the impregnation solution was very low, that considerable turbidity took place and that often the coupling components were separated off, particularly if, for reasons of a more complete exhaustion of the baths the latter contained additions of inorganic salts, preferably of alkali metal chlorides. Thereby, the resistance to rubbing of the dyeing and the penetration of the dyestuff were considerably impaired, particularly when wound bodies were to be dyed.

Now we have found that impregnation solutions of increased stability and showing good wetting properties are obtained if as protective colloids condensation products of partially decomposed protein substances and halides of higher saturated or unsaturated fatty acids are used in admixture with surface active urethanes of the general formula

R—O—CO—NR'—X—Y in which R represents a straight-chain or branched alkyl radical containing about 6 to 13 carbon atoms, R' represents a straight-chain or branched alkyl radical containing 8 or 9 carbon atoms, X means an alkylene radical of low molecular weight containing about 1 to 3 carbon atoms and Y means a carboxylic or sulfonic acid group in the free form or in the form of the water-soluble salts. Furthermore, it has often proved advantageous to add to the mixtures described or to their aqueous preparations for the purpose of stabilization mono- or bifunctional aliphatic alcohols of low molecular weight, containing up to 6 carbon atoms, for instance iso-propanol, 2-ethylhexanol, butyl-glycol or butyl-diglycol.

The degree of decomposition of the protein substances used which are condensed with fatty acid halides according to known processes, is of great importance for the required stability of the solutions of coupling components of the ice color series. For the preparation of the condensation products used according to the invention, there are particularly suitable protein decomposition products of relatively high molecular weight, obtained by hydrolysis of protein substances whose peptide linkages are preserved to a large extent and whose degree of decomposition corresponds to a formal index of about 7 to about 10. Such protein decomposition products are obtained, for instance, by treating lactic acid casein for about 2 hours at about 90° C. with three times its amount by weight of sodium hydroxide solution of about 3.2% strength. Instead of casein, there may likewise be used other protein substances, for instance soya bean protein or scrap leather and the like.

As halides of higher, saturated or unsaturated fatty acids there enter into consideration, first of all, the chlorides and bromides of saturated or mono- or poly-unsaturated fatty acids containing about 10–18 carbon atoms. There may be mentioned, for example, the chlorides and bromides of the following acids: palm-kernel fatty acid, coconut-oil fatty acid, oleic acid, lauric acid, pelargonic acid, myristic acid, palmitic acid, linoleic acid and the like.

The condensation of the protein decomposition products with the halides of higher fatty acids is favorably carried out in the presence of acid-binding agents according to known processes, in the sense of the Schotten-Baumann reaction (cf. L. Gattermann "Die Praxis des organischen Chemikers," 32nd edition (1947), page 118). When proceeding in this manner about 0.1 to about 0.5, particularly 0.2 to 0.3 part by weight of the fatty acid halide is used per part by weight of the protein decomposition product.

The surface active urethanes may be prepared according to the process of U.S. patent application Ser. No. 814,170 filed on May 19, 1959. In said process secondary amines of the general formula

R'—NH—X—Y in which R', X and Y have the meanings given above, are reacted at a temperature of 0–120° C. in aqueous or alcoholic solution in the presence of acid-binding agents with chlorocarbonic acid esters of the general formula R—O—CO—Cl in which R has the meaning given above. As secondary amines of the formula

R'—NH—X—Y there enter into consideration particularly aminoacetic acid, 3-amino-propane-sulfonic acid-(1), 2-amino-propane-sulfonic acid-(1) and, above all, 2-amino-ethanesulfonic acid-(1) carrying at the nitrogen atom preferably one of the following radicals R'

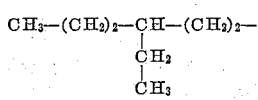

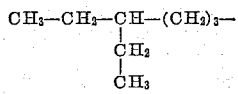

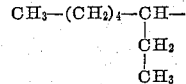

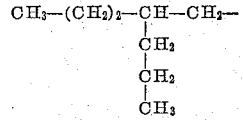

or

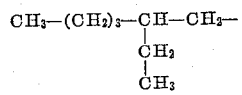

As chlorocarbonic acid esters of the formula

R—O—CO—Cl the following compounds are preferred:

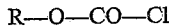

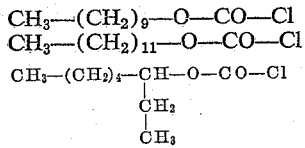

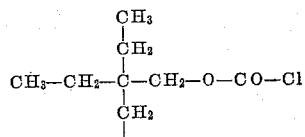

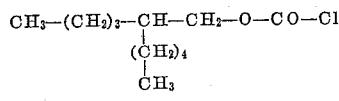

CH₃—(CH₂)₇—O—CO—Cl

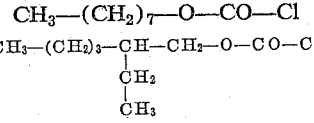

and

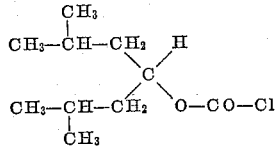

The surface-active urethanes are preferably used in the form of their water-soluble salts, particularly as their alkali metal or ammonium salts. The condensation product of 2-ethyl-hexyl-chloro-carbonic acid ester and the sodium salt of 2-ethyl-hexyl-taurine have proved to be the most suitable surface active urethanes.

The surface-active urethanes are applied in the mixtures according to the invention in amounts of about 0.3 to about 0.9 part by weight per 1 part by weight of the protein fatty acid condensation product.

The mixtures applied according to the invention and consisting of the condensation products of the partially decomposed protein substances, the fatty acid halides and the surface active urethanes are generally added to the impregnation baths in amounts of about 0.5 to 3 grams/liter. According to the dyeing process applied the above-mentioned amounts may be slightly exceeded or reduced.

The aliphatic alcohols to be added, if necessary, to the aqueous preparations of the mixtures according to the invention for the purpose of stabilization are applied in quantities up to about 10% by weight referred to the aqueous preparations.

As coupling components for the process of the present invention there enter into consideration all compounds that can be applied on the fiber from aqueous alkaline solutions and that are capable of reacting with the usual diazotized bases suitable for preparing water-insoluble azo-dyestuffs, as, for instance, o-nitro-aniline, o-chlor-aniline, o-di-anisidine and the like. As such coupling components for the preparation of so-called ice-colors on the fiber there are appropriate, in particular, the following compounds:

Derivatives of 2,3-hydroxy-naphthoic acid as, for instance, 2,3-hydroxy-naphthoic acid anilide of the formula:

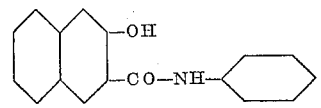

or 2,3-hydroxy-naphthoic acid-4,6-dimethoxy-3-chloranilide

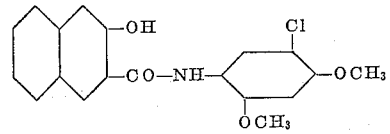

anthracene derivatives, for instance 2,3-hydroxy-anthracene-carboxylic acid-o-toluidide

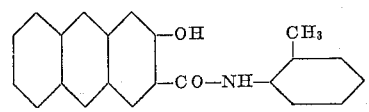

carbazole derivatives, for instance 2-hydroxy-carbazole-3-carboxylic acid -4'-chloranilide

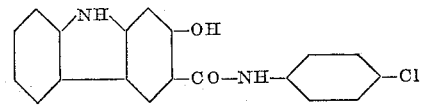

furthermore arylamides of β-keto-carboxylic acids, for instance diacetic acido-tolidide

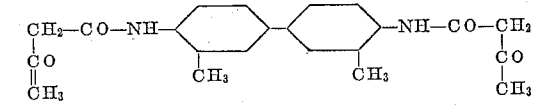

In addition to the chemicals generally used for the preparation of impregnating baths the baths prepared with the mixtures according to the invention may still contain sequestering agents, for instance the sodium salt of ethylene-diamine-tetracetic acid, as well as solvents particularly aliphatic alcohols of low molecular weight.

The baths thus obtained are characterized by good wetting properties permitting the introduction of crude goods into the impregnation baths, without the risk of causing unsatisfactory wetting.

When closely woven goods are treated, the penetration of the dyestuff is favorably influenced. Another advantage of the baths prepared with the mixtures according to the invention is to be seen in that with continuous operation during which the goods treated with the coupling components of the ice-color series prior to development are intermediately dried with the diazo component, the new wetting of the dried goods in the developing bath is performed very quickly.

According to the process of the invention with the use of the above-described mixtures there are obtained impregnation baths of a considerably higher stability than those obtained with the use of the usually used protective colloids and wetting agents. The use of the mixtures according to the invention is of particular advantage if salts are added to the impregnation baths in order to exhaust the latter more intensely.

It is surprising that by means of the mixtures according to the invention a better protective colloidal effect is obtained in solutions of coupling components of the ice-color series than this is possible with the known mixtures of very similar composition of, for instance, condensation products from protein decomposition products of the type of lysalbinic and protalbinic acid with the chlorides of higher fatty acids. Furthermore, it is of importance that the preparation of baths of the coupling components is considerably facilitated if the sodium salts of the coupling components are dissolved in hot solutions of the mixtures according to the invention.

In the following examples the impregnation solutions prepared according to the new process while using the mixtures according to the invention are compared to those prepared according to known processes with mixtures of wetting agents and usual protective colloids.

In the following examples they mean:

*Protective colloid A.*—A protective colloid according to the present invention for the preparation of which there are hydrolized for 2 hours at 90° C. 1 part by weight of lactic acid casein with 2.9 parts of sodium hydroxide solution of 3.2% strength. The protein decomposition product obtained, showing a formal index of 8.2 is condensed with 0.23 part of palm-kernel fatty acid chloride according to Schotten-Baumann, with permanent alkaline reaction, by adding sodium hydroxide solution.

*Protective colloid B.*—A condensation product from oleic acid chloride and protein decomposition products of the type of lysalbinic and protalbinic acid produced by decomposition of 200 parts by weight of chrome leather shavings with 14 parts by weight of lime by heating for 2–3 hours to 110°–115° C. (cf. "Synthetic Detergents" by McCutcheon (1950), page 8).

*Protective colloid C.*—Pure sulfite cellulose liquor (sodium salt of ligninsulfonic acid).

*Wetting agent U.*—A wetting agent according to the present invention obtained by condensation of 1 mol of 2-ethylhexyl-chlorocarbonic acid ester and 1 mol of the sodium salt of 2-ethylhexyl-taurine.

*Wetting agent V.*—Tetrapropylene-benzene-sulfonate.

*Wetting agent W.*—Dodecylphenyl-sulfonate.

*Wetting agent X.*—Alkyl-monosulfonate with 14 to 18 carbon atoms.

*Wetting agent Y.*—Dibutyl-naphthalene-sulfonate.

*Wetting agent Z.*—A mixture of 85% of dodecylphenyl-sulfonate and 15% of oxethylated alkyl-phenol.

In the following examples the protective colloids were applied in each case in the same amount, viz. 0.5 gram/liter. The quantity of wetting agent used in each case was determined with regard to the wetting capacity of the individual agents. The corresponding wetting agent in the solutions was applied in such a concentration that the solution required a wetting period of 100 seconds.

The following examples serve to illustrate the invention, but they are not intended to limit it thereto:

EXAMPLE 1

1.75 grams of 1-(2′,3′-hydroxynaphthoylamino)-naphthalene were dissolved in 3.5 cc. of ethyl alcohol, 0.9 cc. of sodium hydroxide solution of 38° Bé., 2 cc. of warm water and 0.9 cc. of formaldehyde (of 33% strength). The solution thus obtained was stirred into about 700 cc. of water of 35° C. to which 0.5 gram of the protective colloid A, 4 cc. of sodium hydroxide solution of 38° Bé., 20 grams of NaCl (dissolved in 100 cc. of water) and one of the above-mentioned wetting agents had been added. The solution was then adjusted to 1 liter.

The wetting agents used, their concentrations applied and the stability of the individual baths can be seen from Table 1. Under otherwise equal conditions solutions were produced while using the protective colloid B and tested with regard to their stability. The values are given in Table 2.

*Table 1 (Protective Colloid A)*

| G./l. of wetting agent | Solution is turbid after— | Solution precipitated after— |
|---|---|---|
| 0.2 g./l. of wetting agent U | 5 days | 6 days. |
| 0.3 g./l. of wetting agent V | 1½ days | 2 days. |
| 0.4 g./l. of wetting agent W | do | 2½ days. |
| 0.5 g./l. of wetting agent X | 3½ days | 4 days. |
| 1.0 g./l. of wetting agent Y | 1 day | 2 days. |
| 0.7 g./l. of wetting agent Z | 30 minutes | 1 day. |

*Table 2 (Protective Colloid B)*

| G./l. of wetting agent | Solution is turbid after— | Solution precipitated after— |
|---|---|---|
| 0.2 g./l. of wetting agent U | 1½ days | 2 days. |
| 0.3 g./l. of wetting agent V | 1 day | 1 day. |
| 0.4 g./l. of wetting agent W | do | Do. |
| 0.5 g./l. of wetting agent X | 1½ days | 1½ days. |
| 1.0 g./l. of wetting agent Y | 10 hours | 1 day. |
| 0.7 g./l. of wetting agent Z | 30 minutes | half a day. |

EXAMPLE 2

1.75 grams of 1-(2′,3′-hydroxynaphthoylamino)-3-nitrobenzene were dissolved in 3 cc. of ethyl alcohol, 0.6 cc. of sodium hydroxide solution of 38° Bé., 1.5 cc. of warm water and 0.6 cc. of formaldehyde solution (of 33% strength). The solution thus obtained was stirred into about 700 cc. of water of 35° C. to which 0.5 gram of protective colloid A, 10 cc. of sodium hydroxide solution of 38° Bé., 20 grams of NaCl (dissolved in 100 cc. of water) and one of the above-mentioned wetting agents had been added; the solution was adjusted to 1 liter.

The wetting agents used, their concentrations applied and the stability of the baths can be seen from Table 3. Under otherwise equal conditions the solutions were produced with protective colloid B and examined as to their stability. The values are contained in Table 4.

*Table 3 (Protective Colloid A)*

| G./l. of wetting agent | Solution is turbid after— | Solution precipitated after— |
|---|---|---|
| 0.2 g./l. of wetting agent U | 4½ days | 5½ days. |
| 0.3 g./l. of wetting agent V | 2 days | 2½ days. |
| 0.4 g./l. of wetting agent W | do | Do. |
| 0.5 g./l. of wetting agent X | 2½ days | 3 days. |
| 1.0 g./l. of wetting agent Y | do | 3½ days. |
| 0.7 g./l. of wetting agent Z | 1 hour | 1 day. |

*Table 4 (Protective Colloid B)*

| G./l. of wetting agent | Solution is turbid after— | Solution precipitated after— |
|---|---|---|
| 0.2 g./l. of wetting agent U | 2½ days | 3½ days. |
| 0.3 g./l. of wetting agent V | 2 days | 2½ days. |
| 0.4 g./l. of wetting agent W | 7 hours | 1 day. |
| 0.5 g./l. of wetting agent X | do | Do. |
| 1.0 g./l. of wetting agent Y | 1½ day | 2½ days. |
| 0.7 g./l. of wetting agent Z | 1 hour | 5 hours. |

EXAMPLE 3

2.5 grams of 1- (2′,3′-hydroxynaphthoylamino)-2,4-methoxy-5-chloro-benzene were dissolved in 7.5 cc. of ethyl alcohol, 1.2 cc. of sodium hydroxide solution (38° Bé.), 2.5 cc. of water of 35° C. and 1.2 cc. of formaldehyde solution (of 33% strength). The solution thus obtained was stirred into about 600 cc. of water of 35° C. to which 0.5 gram of protective colloid A and 0.2 gram of wetting agent U, 10 cc. of sodium hydroxide solution of 38° Bé., and 20 grams of NaCl (dissolved in 100 cc. of water) had been added. The solution was then adjusted to 1 liter. A clear red solution was obtained which after 2½ days was still clear.

In comparison thereto the following Table 5 shows the stability of the solutions if instead of the mixture according to the invention and containing protective colloid A and wetting agent U, other auxiliary agents were used:

Table 5

| G./l. of protective colloid | G./l. of wetting agent | Solution turbid after— | Solution precipitated after— |
|---|---|---|---|
| 0.5 g./l. A | 0.2 g./l. U | 3 days | 4 days. |
| 0.5 g./l. B | do | 15 hours | 1 day. |
| Do | 1 g./l. Y | 6 hours | 7 hours. |
| Do | 0.6 g./l. Z | 7 hours | 15 hours. |
| 2 g./l. C | 1 g./l. Y | 2 hours | 12 hours. |

We claim:
1. In the method of preparing solutions of coupling components of ice colors the step which comprises admixing to the solution of the coupling component (a) a condensation product of about 0.1 to about 0.5 part by weight of halides of high molecular carboxylic acids and 1 part by weight of a partially decomposed protein having a degree of decomposition which corresponds to a formal index of from 7 to 10 and (b) surface active urethanes of the general formula

R—O—CO—NR'—X—Y wherein R stands for an alkyl radical containing 6 to 13 carbon atoms, R' stands for an alkyl radical containing 8 to 9 carbon atoms, X represents an alkylene radical containing 1 to 3 carbon atoms and Y represents a member selected from the group consisting of a carboxylic acid, a sulfonic acid and an alkali metal salt and an ammonium salt of these two acid groups, and (c) lower aliphatic alcohols containing up to 6 carbon atoms.

2. In the method of preparing solutions of coupling components of ice colors the step which comprises admixing to the solution of the coupling component (a) a condensation product of about 0.1 to about 0.5 part by weight of halides of high molecular carboxylic acids and 1 part by weight of a partially decomposed protein having a degree of decomposition which corresponds to a formal index of from 7 to 10 and (b) surface active urethanes of the general formula

R—O—CO—NR'—X—Y wherein R stands for an alkyl radical containing 6 to 13 carbon atoms, R' stands for an alkyl radical containing 8 to 9 carbon atoms, X represents an alkylene radical containing 1 to 3 carbon atoms and Y represents a member selected from the group consisting of a carboxylic acid, a sulfonic acid and an alkali metal salt and an ammonium salt of these two acid groups.

3. A process step as claimed in claim 1 wherein per 1 part by weight of the component specified under (a) 0.3 to 0.9 part by weight of the component specified under (b) is used.

4. A process step as claimed in claim 1 wherein 0.5 up to 3 grams of the mixture of the component specified under (a) and of the component specified under (b) are added per liter of impregnation solution.

5. A process step as claimed in claim 1 wherein the condensation products specified under (a) are prepared from 0.1 up to 0.5 part by weight of a fatty acid halide containing 10 to 18 carbon atoms and 1 part by weight of a partially decomposed protein.

6. A process step as claimed in claim 1 wherein 0.23 part by weight of palm-kernel fatty acid chloride is condensed with 1 part by weight of a decomposition product of lactic acid casein having a formal index of 8.2.

7. A process step as claimed in claim 1 wherein as component (b) a condensation product of 1 mol of 2-ethylhexyl-chlorocarbonic acid ester and 1 mol of the sodium salt of 2-ethylhexyl-taurine is used.

8. A process step as claimed in claim 1 wherein the condensation products specified under (a) are prepared from 0.2 to 0.3 part by weight of a fatty acid halide containing 10 to 18 carbon atoms and 1 part by weight of a partially decomposed protein.

9. Impregnation solution of a coupling component of ice colors containing (a) a condensation product of about 0.1 to about 0.5 part by weight of halides of high molecular carboxylic acids and 1 part by weight of a partially decomposed protein having a degree of decomposition which corresponds to a formal index of from 7 to 10 and (b) surface active urethanes of the general formula

R—O—CO—NR'—X—Y wherein R stands for an alkyl radical containing 6 to 13 carbon atoms, R' stands for an alkyl radical containing 8 to 9 carbon atoms, X represents an alkylene radical containing 1 to 3 carbon atoms, and Y represents a member selected from the group consisting of a carboxylic acid, a sulfonic acid and an alkali metal salt and an ammonium salt of these two acid groups.

References Cited in the file of this patent
UNITED STATES PATENTS
1,870,498   Ellner _____ Aug. 9, 1932
OTHER REFERENCES
Schwartz et al.: Surface Active Agents, vol. 1, page 77, 1949, Interscience Publishers, Inc., N.Y.